(12) United States Patent
Dolev et al.

(10) Patent No.: US 10,467,389 B2
(45) Date of Patent: Nov. 5, 2019

(54) SECRET SHARED RANDOM ACCESS MACHINE

(71) Applicant: SECRETSKYDB LTD, Beer-Sheva (IL)

(72) Inventors: Shlomo Dolev, Omer (IL); Yin Li, Xinjiang (CN)

(73) Assignee: SECRETSKYDBLTD, Beer-Sheva (IL)

( * ) Notice: Subject to any disclaimer, the term of this patent is extended or adjusted under 35 U.S.C. 154(b) by 31 days.

(21) Appl. No.: 15/543,925

(22) PCT Filed: Jan. 14, 2016

(86) PCT No.: PCT/IL2016/050044
§ 371 (c)(1),
(2) Date: Jul. 14, 2017

(87) PCT Pub. No.: WO2016/113738
PCT Pub. Date: Jul. 21, 2016

(65) Prior Publication Data
US 2018/0011996 A1    Jan. 11, 2018

Related U.S. Application Data

(60) Provisional application No. 62/103,589, filed on Jan. 15, 2015, provisional application No. 62/114,084, (Continued)

(51) Int. Cl.
*G06F 21/14* (2013.01)
*G06F 21/75* (2013.01)
(Continued)

(52) U.S. Cl.
CPC ............... *G06F 21/14* (2013.01); *G06F 9/46* (2013.01); *G06F 21/75* (2013.01); *H04L 9/0656* (2013.01); *H04L 9/085* (2013.01); *G06F 12/1408* (2013.01)

(58) Field of Classification Search
CPC . G06F 20/14; G06F 21/75; G06F 9/46; G06F 12/1408
See application file for complete search history.

(56) References Cited

U.S. PATENT DOCUMENTS

| 4,633,470 A | 12/1986 | Welch et al. | |
| 2012/0185946 A1* | 7/2012 | Kamara | G06F 9/5072 726/26 |
| 2015/0193628 A1* | 7/2015 | Maniatakos | G06F 21/602 713/164 |

FOREIGN PATENT DOCUMENTS

WO    WO 2014/174516 A1    10/2014

OTHER PUBLICATIONS

Nektarios Georgios Tsoutsos and Michail Maniatakos, HEROIC: Homomorphically EncRypted One Instruction Computer, 2014, IEEE, pp. 1-6 (Year: 2014).*

(Continued)

*Primary Examiner* — Ellen Tran
(74) *Attorney, Agent, or Firm* — Fenwick & West LLP

(57) ABSTRACT

A method of providing a distributed scheme for executing a RAM program, without revealing any information regarding the program, the data and the results, according to which the instructions of the program are simulated using SUBLEQ instructions and the execution of the program is divided among a plurality of participating computational resources such as one or more clouds, which do not communicate with each other, while secret sharing all the program's SUBLEQ instructions, to hide their nature of operation and the sequence of operations. Private string matching is secretly performed by comparing strings represented in secret shares, for ensuring the execution of the right instruction sequence. Then arithmetic operations are performed over secret shared bits and branch operations are performed according to the secret shared sign bit of the result.

24 Claims, 2 Drawing Sheets

Related U.S. Application Data filed on Feb. 10, 2015, provisional application No. 62/206,868, filed on Aug. 19, 2015.

(51) Int. Cl.
  *H04L 9/06* (2006.01)
  *H04L 9/08* (2006.01)
  *G06F 9/46* (2006.01)
  *G06F 12/14* (2006.01)

(56) References Cited

OTHER PUBLICATIONS

Dolev, S., et al., "Accumulating Automata and Cascaded Equations Automata for Communicationless Information Theoretically Secure Multi-Party Computation," Aug. 11, 2014, 23 Pages, Retrieved from the Internet: <URL:http://eprint.iacr.org/2014/611/20140813:233811>.

Dolev, S., et al., "Secret Shared Random Access Machine," Mar. 28, 2015, 13 Pages.

Patent Cooperation Treaty, International Search Report, International Patent Application No. PCT/IL2016/050044, dated Apr. 17, 2016, 3 Pages.

Patent Cooperation Treaty, Written Opinion of the International Searching Authority, International Patent Application No. PCT/IL2016/050044, dated Apr. 17, 2016, 4 Pages.

Shamir, A., "How to Share a Secret," Communications of the ACM, vol. 22, No. 11, Nov. 1979, 2 Pages.

Tsoutsos, N.G., et al., "HEROIC: Homomorphically EncRypted One Instructions Computer," IEEE Design Automation & Test in European Conference & Exhibition, Mar. 24-28, 2014, 6 Pages.

\* cited by examiner

SECRET SHARED RANDOM ACCESS MACHINE

FIELD OF THE INVENTION

The present invention relates to the field of distributed computing, such as cloud computing. More specifically, the present invention is related to a method of providing a distributed scheme for executing RAM programs, without revealing any information regarding the program, the data and the results.

BACKGROUND OF THE INVENTION

A random access machine (RAM) is a simple model of computation. Its memory consists of an unbounded sequence of registers. Each of the registers may hold an integer value. The control unit of a RAM holds a program, i.e. a numbered list of statements. The program counter (PC) determines which statement is to be executed next. A RAM-program is executed while in each work cycle, the RAM executes one statement of the program. The program counter specifies the number of the statement that is to be executed.

To run a program in the RAM, it is required to:
define the program, i.e. the exact list of statements;
define starting values for the registers (the initial input);
define starting values for the program counter (usually, starting with the first statement).

Secure and private computations over RAM are preferred over computations with circuits or Turing machines. Secure and private RAM executions become more and more important in the scope avoiding information leakage when executing programs over a single computer as well as over the clouds.

Cloud computing (for the delivery of hosted services over the Internet, which enables companies to consume compute resources as a utility, rather than having to build and maintain computing infrastructures in-house) provides cost-efficient and flexible shared infrastructure and computational services on demand for various customers who need to store and operate on a huge amount of data. Until now, there are various services providers such as Amazon and Google who offer platforms, software, and storage outsourcing applications. Much attention has been paid to these platforms due to the potential benefits and business opportunities that clouds could bring. However, cloud computing also introduces security and privacy risks for the clients. For example, some of the cloud providers are not perfectly reliable and are vulnerable to network attacks and data leakage. Furthermore, even a single computer with the same cloud organization is untrustworthy.

There are possible attacks on a single computer, during which information is copied from the bus of the computer and sent to an adversary. Therefore, it is extremely important that a server will process unrevealed programs over unrevealed data, in information theoretical secure manner.

One of the most important requirements of the cloud clients is to process their data in a confidential way. Several techniques are applied to address data storage privacy and security computation on clouds. Among these studies, security in evaluating a Random Access Machine (RAM) program is an important task, since many modern algorithms are operating on the von Neumann RAM architecture (a computer architecture for an electronic digital computer with parts consisting of a processing unit containing an arithmetic logic unit and processor registers, a control unit containing an instruction register and program counter, a memory to store both data and instructions, external mass storage, and input and output mechanisms).

There are mainly two existing ways for secure computation of RAM programs. The first way, is to convert a RAM (one shot) program into circuits and the second is to use oblivious RAM (a data encryption tool where the access pattern is independent of the inputs to the algorithm so that it hides not only the data but also the associated algorithms and executed operations, it works by). Oblivious RAM schemes are preferred as they can implement a never ending program (such as an operating system and) there is no need to convert the program into a binary circuit, which leads to a huge blowup in program size and its running time.

Even though the proposed solutions for secure RAM evaluation can address various privacy challenges including two-party, multiparty or large-scale computation against semi-honest or malicious adversaries, they all assume that the processors used by clouds are trustworthy. Thus, in these proposed solutions, the CPU has to decrypt the input data before processing and then encrypt the output data again. During these years, the semiconductor design and fabrication process became global, integrated circuits tend to be increasingly vulnerable to malicious activities and alterations. An adversary can introduce a special hardware Trojan, designed to disable or destroy a system in the future, or leak confidential information. Similar attack has already been demonstrated, where a specially designed Trojan (malicious computer program) in the CPU revealed sensitive information to the adversary.

A client wishing to run a program on the clouds does not want to reveal any information about both the program and the data. The cloud with untrusted hardware that listens to the bus may extract information on the internal activity of the processor.

Unfortunately, none of the protocols that decrypt data prior to processing and manipulating the data can avoid information leakage when the adversary acts within the hardware. Thus, there is a need to execute an encrypted program on encrypted data without decrypting neither the program nor the data. In order to protect privacy, a straightforward approach is to execute the encrypted instructions in the clouds processors directly.

Fully Homomorphic Encryption (FHE—a cryptosystem that supports arbitrary computation on ciphertexts, which enables the construction of programs for any desirable functionality, which can be run on encrypted inputs to produce an encryption of the result. Since such a program need never decrypt its inputs, it can be run by an untrusted party without revealing its inputs and internal state. The existence of an efficient and fully homomorphic cryptosystem would have great practical implications in the outsourcing of private computations, for instance, in the context of cloud computing) is a way to achieve this goal. However, the main problem is that the proposed scheme caused high overhead of computation, which make FHE less practical. Moreover, Gentry's scheme relied on the hardness assumptions on ideal lattices which is only computationally secure, rather than key-less information that is information theoretical secure.

It is therefore an object of the present invention, to provide a distributed scheme for executing RAM programs without revealing any information regarding the computation.

It is another object of the present invention, to provide a distributed scheme for executing RAM programs without revealing any information regarding the program, the data and the result.

It is yet another object of the present invention, to provide a distributed scheme for computing RAM programs which is information theoretic secure RAM execution of perfectly unrevealed programs.

It is still another object of the present invention, to provide a distributed scheme for computing RAM programs which is compatible with big data that is stored in a secret sharing fashion over the clouds, without reconstructing the data from the shares.

Other objects advantages of the present invention will become clear as the description proceeds.

SUMMARY OF THE INVENTION

The present invention is directed to a method of providing a distributed scheme for executing a RAM program, without revealing any information regarding the program, the data and the results, according to which the instructions of the program are simulated using OISC instructions (such as SUBLEQ instructions) and the execution of the program is divided among a plurality of participating computational resources (e.g. one or more clouds) which do not communicate with each other, while secret sharing all the program's OISC instructions, to hide their nature of operation and the sequence of operations. Private string matching is secretly performed by comparing strings represented in secret shares, for ensuring the execution of the right instruction sequence. Then arithmetic operations are performed over secret shared bits and branch operations are performed according to the secret shared sign bit of the result.

Secret sharing may be performed according to Shamir's secret sharing, using random polynomials $P(x)$ by allowing a dealer to:
  a) select additional points, x, such that, $P(x)=0$ when choosing the random polynomials $P(x)$; and
  b) distribute n points having x values which are different from the x values of these additional points in $P(x)=0$, while storing the additional points to itself as an additional secret for revealing the polynomials value.

Whenever performing multiplication operation is required, degree reduction of the polynomial used for secret sharing is performed.

The dealer can reconstruct the polynomial and the secret, using the n points of the polynomial that are maintained by the participating clouds with the additional points that are maintained by the dealer.

The keys may be restricted to be points in which the polynomial is zero for every value, thereby allowing additions and multiplications while preserving the secret key unchanged.

String matching of secret shares may be performed according to the scheme of Accumulating Automata and Cascaded Equations Automata using unary, binary or other representations, and secret shares of the searched pattern.

Secret shared Subleq may be created using a unary representation to represent the addresses including memory addresses and instruction indices, where each bit of the unary representation is encoded as a secret shared value. The first block stores the instruction index number, being equivalent to the instruction address, the second and the third blocks store the operand addresses and the fourth to fifth blocks store the branch index and the index of next instruction, respectively.

Subtraction may be performed by representing every operand as a signed number using a Two's complement representation and transforming subtraction into addition, such that the most significant bit is the sign bit.

The dealer may divide the execution among participating clouds by:
  a) encoding the address using unary representation;
  b) encoding the data item using Two's complement representation;
  c) allowing the dealer to pick random polynomials of degree X to share every bit of the address and data; and
  d) allowing the dealer to send the secret shared program to E participating clouds, such that the integer E is greater than the highest polynomial degree generated.

In one aspect, all programs may consist of the same sequence of opcodes, where the execution may execute all opcodes and select only the one intended.

According to one embodiment, instead of using only the SUBLEQ command, a program to be executed by untrusted participating clouds may remain unrevealed using a fixed set of commands that appear in a fixed order.

The RAM program may use a modified Harvard architecture which physically separates storage and signal pathways for instructions and data. The RAM program may separate the read-only and read/write part of data.

In one aspect, the degree of the polynomials is reduced after a predetermined number of multiplications or may be used for the read-only part and is unchanged throughout the execution(s).

The read/write part of the memory may be refreshed at intervals of several WRITE operations.

The execution may be performed blindly, and is defined by the operands addresses, some of which are designed to have no effect.

The program can be run over one or more computational resources, such that possible leakage may reach the same vendor or country or entity, or over one or more computational resources, such that possible leakage may reach competing, non-collaborating, vendors or countries or entities.

The present invention is also directed to a system of providing a distributed scheme for executing a RAM program, without revealing any information regarding the program, the data and the results, which comprises:
  a) a compiler for simulating the instructions of the program using SUBLEQ instructions;
  b) a plurality of computational participating clouds, each of which is a adapted to execute a portion of the RAM program;
  c) a computerized dealer, being in bidirectional communication with the clouds, for dividing the execution of the program among the clouds to program portions using secret sharing, based on random polynomials and for and composing the result of executing the program by collecting partial results, each of which being the outcome of executing a portion of the RAM program assigned to a cloud;
  d) at least one computerized randomizer being in bidirectional communication with the clouds, for providing the random polynomials to the clouds; and
  e) at least one computerized reducer being in bidirectional communication with the clouds, for reducing the degree of polynomials in response to the execution of multiplication instructions, without revealing the secret.

Several reducers may be used for checking the integrity of the results and in case of non-integrity, identifying which reducer is malicious. The dealer and the reducer(s) may share common roots of all polynomials, unknown to the participating clouds, such that additions and multiplications keep the roots unchanged.

DETAILED DESCRIPTION OF THE INVENTION

Figures 1, 2:
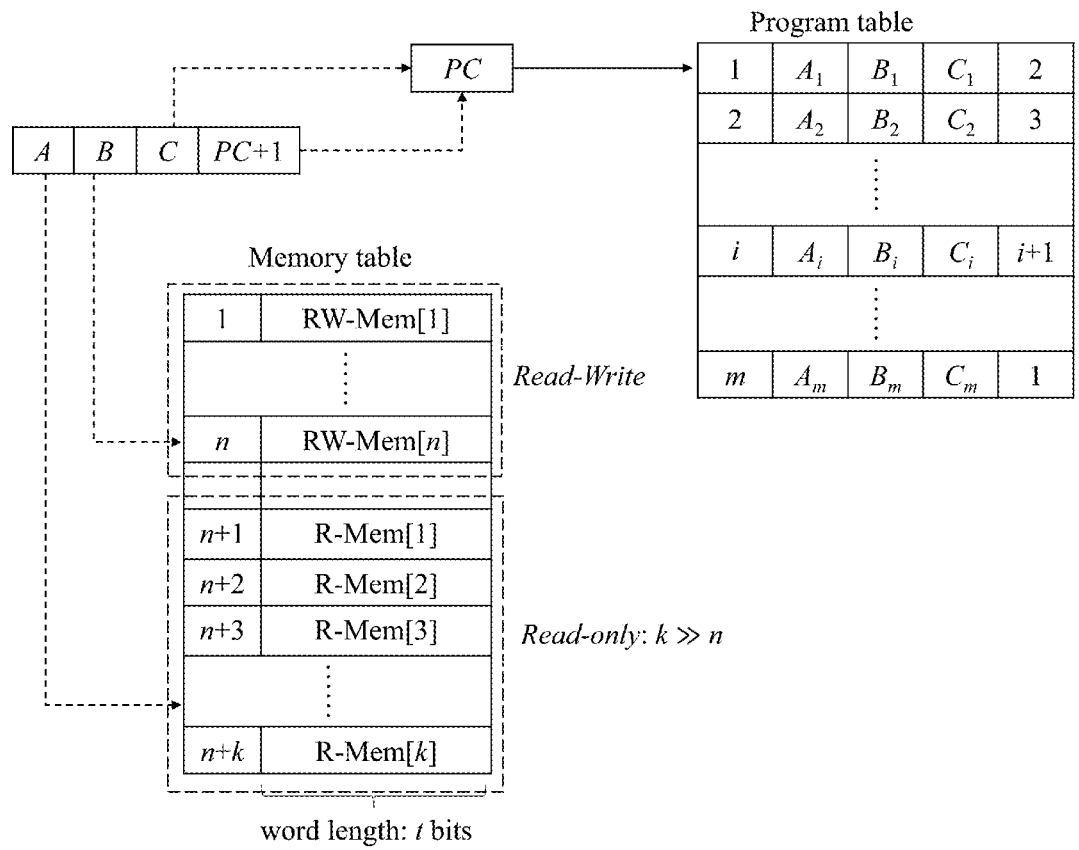
FIG. 1 illustrates a format of the SSS-Subleq instruction, according to an embodiment of the invention.
FIG. 2. Illustrates the outline of the RAM architecture, proposed by the present invention.

The present invention proposes a novel distributed scheme for executing RAM programs without revealing any information regarding the computation, including the program, the data and the result. The secret sharing (such as Shamir's secret sharing) is used to share all the program instructions and private string matching techniques, to ensure the execution of the right instruction sequence. The new proposed scheme is information theoretic secure (i.e., the security is derived purely from information theory and cannot be broken even when the adversary has unlimited computing power) and does not rely on any computational hardness assumptions, thereby gaining indefinite private and secure RAM execution of perfectly unrevealed programs.

The proposed model for outsourcing arbitrary computations provides confidentiality, integrity, and verifiability. Unlike the former RAM-based secure computation models, the proposed scheme hides the client program and data all the time, and manipulates the secrets directly. Therefore, no confidential information would be revealed. The setting is particularly interesting in the scope of big data (i.e., any voluminous amount of structured, semi-structured and unstructured data that has the potential to be mined for information) that is stored in a secret sharing fashion over the clouds, and there is a need to repeatedly compute functions over the data without reconstructing the data from the shares. The implementation of interactive program made possible by reading and writing specific memory locations during the execution.

The proposed method uses a combination of Shamir's Secret Sharing (A. Shamir, "How to share a secret", Communications of the ACM, vol. 22, no. 11, pp. 612-613, November 1979) and the proposed Accumulating Automata, described in WO 2014/174516.

Secret sharing is used to utilize perfect privacy of the client's program and processor states and string matching is used to facilitate instruction execution. The modern instruction set, for example, Complex Instruction Set Computer (CISC—refers to computers designed with a full set of computer instructions that were intended to provide needed capabilities in the most efficient way) are too complicated when there is a need to hide their nature of operation and the sequence of operations they form. Thus the proposed model uses One Instruction Set Computer (OISC), which is a machine that uses only one instruction, while obviating the need for a machine language Operational Code (OpCode— the portion of a machine language instruction that specifies the operation to be performed). Furthermore, the approach proposed by the present invention could extended to Reduced Instruction Set Computer (RISC—is a microprocessor that is designed to perform a smaller number of types of computer instructions so that it can operate at a higher speed), where a small number of instructions could be utilized to implement the whole program.

By applying secret string matching technique described in "Accumulating Automata and Cascaded Equations Automata for Communicationless Information Theoretically Secure Multi-Party Computation" (S. Dolev, N. Gilboa and X. Li, Cryptology ePrint Archive, Report 2014/611, 2014) it is possible to simulate the OISC instruction SUbtract and Branch if Less than or EQual to zero (SUBLEQ—the SUBLEQ instruction subtracts the contents at address A from the contents at address B, stores the result at address B, and then, if the result is not positive, transfers control to address C. If the result is positive, execution proceeds to the next instruction in sequence) and other similar instructions that can be combined to form a RISC machine. The Accumulating Automata allows performing string matching secretly without revealing any information, which is the key for achieving the security requirement.

Shamir Secret Sharing (SSS)

Shamir Secret Sharing (SSS) is an information theoretic secure protocol, which allows a dealer to secret share a values s among E players. There is a threshold $\delta$ for the scheme, such that, the knowledge of or fewer player secrets make the adversary learn no information about s, but if more than players communicate their shares to each other, they can easily recover the secret.

Distribution: The dealer picks a random polynomial $f \in F_p$ [x] of degree $\delta < E$ such that $f(0)=s \in F_p$. The dealer also chooses E arbitrary non-zero indices $\alpha_1, \ldots, \alpha_E$, computes $f(\alpha_i)$ for $1 \le i \le E$ and send $(\alpha_i, f(\alpha_i))$ to each corresponding players.

Reconstruction: Any $\delta+1$ players can reconstruct the polynomial f by applying Lagrange interpolation to the tuples $(\alpha_i, f(\alpha_i))$. They recover the secret by computing $f(0)$ mod $p=s$.

Shamir secret sharing is additively homomorphic but is not multiplicatively homomorphic. If it is required to perform multiplication using Shamir secret shares, a special "degree reduction step" is required (as will be detailed below).

Secret Sharing by the Dealer

According to an embodiment of the invention, secret sharing among n participants (clouds) is possible using a polynomial of degree $m<n-1$. In this case, the dealer selects random polynomials $P(x)$ of degree m and distributes n points to the participants, while the value $P(0)$ is the secret.

In one example, $P(x)$ may be selected with a degree greater than $n-1$, where the missing points for defining $P(x)$ are points with $P(x)=0$. In this example, the extra points are held by the dealer as an extra security key for interpretation of the polynomial to reveal the secret $P(0)$. The additional $P(x)=0$ points are closed under additions and multiplications.

In case of secure multiparty computation with a bounded number of computations (as in e.g., the accumulating automata and SSS) where the number of participants is small, it is possible to manage the values by restricting the keys to be the roots of $P(x)$. Thereby, this type of polynomials allows additions and multiplications while preserving the secret key (the roots) unchanged, as the addition of these polynomials which have a zero value at a point x remains zero. The same applies when the polynomial is multiplied by a number). When two polynomials are used as an operand in computation such that they both share the same roots (which are additional secret keys), then every computed value (following addition and multiplication) results in a polynomial (possibly with higher degree in the case of multiplication) for which by the set of indexes in which the value is zero is unchanged. Thus, the additional secret keys are unchanged.

The applications of such a scheme are relevant to all secret sharing applications, including privacy preserving in communication and in data (e.g. cloud). The security is not based on one-way-function assumption, but on the need to guess the secret keys which are actually the roots/values of the polynomials. The difficulty to guess these points grows exponentially with the number of missing points (keys).

Private String Matching

A secret string matching algorithm using Accumulating Automata has been disclosed in "Accumulating Automata and Cascaded Equations Automata for Communicationless Information Theoretically Secure Multi-Party Computation" (S. Dolev, N. Gilboa and X. Li, Cryptology ePrint Archive, Report 2014/611, 2014—also published as an international patent application WO 2014/174516). This string-match algorithm runs on several cloud servers. The strings to be compared are originally secret shared using Shamir secret sharing scheme (possibly using unary representation of the compared characters, multiplication of the secret shared used for unary representation of the corresponding bits of the string to be matched and the data it should be match with, secret shares of one bit with another and summation that result in secret shared 1 if there is a match and 0 otherwise. This can be repeated for every character in the strings and multiplication among the results getting secret shared 1 when the match is true and 0 otherwise), and therefore stay unknown to the processing servers. During the entire process, the participating clouds do not communicate with each other.

Unary Representation

The comparison of two strings represented in secret shares is different from the comparison of strings in a plaintext format, as each of the participants cannot judge the compare result independently. The scheme of "Accumulating Automata and Cascaded Equations Automata for Communicationless Information Theoretically Secure Multi-Party Computation" has been applied over unary letter representation, where each letter is represented by a binary number with hamming weight 1. For example, letter a-z are expressed by the binary strings: a=[100 . . . 00]; b=[010 . . . 00]; c=[001 . . . 00]; z=[000 . . . 01] with each representation consists of 26 bits. The expression $$S = \sum_{i=0}^{r} u_i = v_i$$

is used to compare two letters, where $[u_0 u_1 \ldots u_r]$ and $[v_0 v_1 \ldots v_r]$ are two unary representations. It is clear that whenever the two representations are identical, S is equal to 1, otherwise S is equal to 0. Assuming that each cloud has the secret shares of these two representations, i.e., $(\alpha, f_i(\alpha))$ and $(\alpha, g_i(\alpha))$, where $f_i(0) = u_i$ and $g_i(0) = v_i$ The following equation can be computed to identify whether the two letters are identical:

$$\sum_{i=1}^{r} (f_i(\alpha) \times g_i(\alpha)). \quad (1)$$

Lemma 1: If the two letters are identical, then the result of Equation (1) is the secret share of 1, otherwise the result of this equation is a secret share of 0.

Proof-$u_i$, $v_i$ are the secret bit and would be either 1 or 0. If $f_i^1(\alpha)$ and $g_i^1(\alpha)$ denote the evaluation of f(x) and g(x) at point a without the constant term respectively. It can be seen that $$f_i(\alpha) \times g_i(\alpha) = (f_i'(\alpha) + u_i) \times (g_i'(\alpha) + v_i)$$
$$= f_i'(\alpha) g_i'(\alpha) + u_i g_i'(\alpha) + v_i f_i'(\alpha) + u_i v_i$$
$$= F(\alpha) + u_i v_i,$$

where $F(\alpha) = f_i^1(\alpha) g_i^1(\alpha) + u_i g_i^1(\alpha) + v_i f_i^1(\alpha)$. Therefore, $f_i(\alpha) \times g_i(\alpha)$ can he seen as a secret share of $u_i v_i$.

It is clear that only when $u_i = v_i = 1$, $f_i(\alpha) \times g_i(\alpha)$ is a secret share of 1, and otherwise it is a secret share of Value 0. Since the Hamming weight (the Hamming weight of a string is the number of symbols that are different from the zero-symbol of the alphabet used) of unary representation is only 1, one can directly find the finial summation is at most 1 which concludes the result. Based on Lemma 1, it is easy to compare a string using Accumulating Automata, which is a type of finite automata. Only when the string letters are exactly the same, the last node will be set to 1, otherwise this node will stay at 0. One can reconstruct the values of this node to identify whether the string matching is successful or not.

Binary Representation:

The main drawback of unary representation is that it has too many redundant bits. For example if one wants to represent the numbers 1 to 1000, 1000 bits should be uses. An alternative method is to use binary representation. However, comparing two letters in binary form secretly is similar to string matching and slightly more complicated.

Assuming that there are two letters represented as $[u_0, u_1 \ldots, u_r]2$ and $[v_0 v_1 \ldots, v_r]2$, where $u_i, v_i \in \{0,1\}$.

These letters are compared using the Algorithm 1 below:

Algorithm 1 Secret comparison of two letters using binary representation

1: for i = 1 to r do
2:   $s_i = [u_i - v_i]^2$
3: end for
4: S = 0
5: for i = 1 to r do
6:   S = S + $s_i$ - S × $s_i$
7: end for
8: return 1 - S    ▷ Compatible with unary As a simple example, consider two binary strings $[1010]_2$ and $[1101]_2$. According to the description above, we the following computations are performed:

Bitwise subtract, [1, 0, 1, 0]−[1, 1, 0, 1]=[1−1,0−1, 1−0,0−1]=[0,−1, 1, −1];

Bitwise squaring, $[0^2, (-1)^2, 1^2; (-1)^2]$=[0, 1, 1, 1];

Bitwise OR, S=0|1|1|1=1 (Step 6 in Algorithm 1 is equivalent to the bitwise OR operation)

It is easy to check that if the two strings are equal, S is equal to 0 and otherwise to 1. In this example, the value of S is 1. In order to return the same value as the unary representation, it is preferred to return 1-S rather than S. Only the subtraction/addition and multiplication are used in the above algorithm, similarly to the unary case. These operations can also be implemented using Shamir secret sharing, particularly representing 1 by secret shares as well.

However, compared with unary representation, it requires either more participants or (more) degree reduction operations.

One Instruction Computer Set

As mentioned above, the classic CISC command list consists of hundreds of different instructions. If these instructions are employed using the Shamir Secret sharing, extra calculations should be performed to identify different instructions, which may reveal information on the executed program. Therefore, a single instruction architecture (also called One Instruction Set Computer, OISC) is applied here.

OISC is an abstract machine that uses only one instruction. It is proven that OISC is capable of being a universal computer in the same manner as traditional computers with multiple instructions. This indicates that one instruction set computers are very powerful, despite the simplicity of the design, and can achieve high throughput under certain configurations. Since there is only one instruction in the system, it needs no identification to determine which instruction to execute. Thus, it is only needed to design the implementation of one instruction. Later, in order to increase efficiency, a SUBLEQ (commands in each PC address) is executed and the result of the right one is blindly selected.

Actually, there are several options for choosing the OISC instruction, such as Subtract And Branch If Not Equal To Zero (SBNZ), Subtract And Branch If Less Than Or Equal To Zero (SUBLEQ), Add And Branch Unless Positive (ADDLEQ). Among these instructions, SUBLEQ is the most commonly used. Nowadays, there are a SUBLEQ complier and a SUBLEQ-based processor, which make SUBLEQ a practical and efficient choice. Therefore, the way how to simulate SUBLEQ privately and secretly is described.

Comparing the values of two memory words that are represented by secret shares, is hard to implement. Therefore, the words are secret shared bit by bit, the arithmetic is performed over secret shared bits and then branch is performed, according to the sign bit of the result. This leads to a novel scheme for executing Shamir Secret Shared SUBLEQ (SSS-Subleq) programs, as described below.

SSS-SUBLEQ Programs and their Execution

Since the proposed architecture is built on SUBLEQ, any client programs written by high-level languages first needs to be compiled into SUBLEQ codes. Then the client executes the set of SUBLEQs over the system.

The SSS-Subleq Format and Architecture

According to the definition of Subleq, it has three parameters A,B,C where the contents at address B are subtracted from the contents at address A, and the result is stored at address B, and then, if the result is not greater than 0, the execution jumps to the memory address C, otherwise it continues to the next instruction in the sequence. The pseudo code of Subleq is as follows:

| Procedure SUBLEQ(A, B, C) |
|---|
| 1: Mem[B] = Mem[B]–Mem[A] |
| 2: if Mem[B]≤ 0 then |
| 3:   goto C |
| 4: else |
| 5:   goto PC + 1 |
| 6: end if |

The parameters A, B, C are secret shared, and therefore, they are not revealed in any stage of execution. This way, each participating cloud executes an unrevealed portion of the program with unrevealed instructions. Also, jumping to the memory address C in each cycle is also unrevealed.

Here, the PC (Program Counter) is a pointer that indicates the address of next instruction. The SUBLEQ contains some important operations: load, store, subtraction and conditional branch. Thus, in order to execute a SUBLEQ using SSS, the following operations should be simulated using secret shares:

LOAD(H): Load the instruction in address H to the processor.

JUMP(C): Transfers control to index C, implement the branching operation.

READ(X): Read the data at address X.

WRITE(X; Y): Write the data Y in address X.

Here, the operation goto PC+1 and goto C can be implemented by the operation JUMP with different parameters. Among all these operations, a critical problem is how to find the right address secretly. Secret string matching allows implementing these operations without revealing any information.

For simplicity, unary representation is used to represent the addresses including memory addresses and instruction indices, where each bit of the unary representation is encoded as a secret shared value. The format of the SSS-Subleq instruction has five parts, which are shown in FIG. 1.

The first block stores the instruction index number, which is equivalent to the instruction address. The second and the third blocks store the operand addresses and the fourth to fifth blocks store the branch index C and the index of next instruction, respectively.

Besides the former operations, there is a need to implement the subtraction between two operands and determine the next instruction address according to the subtraction result. Therefore, every operand is represented as a signed number. In order to perform subtraction in an easy way, a Two's complement representation (a mathematical operation on binary numbers, as well as a binary signed number representation based on this operation) is used, where subtraction can be transformed into addition. The most significant bit (MSB) is the sign bit. Analogous with the address, each bit of the operands is secret shared.

The outline of the proposed RAM architecture is presented in FIG. 2. The proposed RAM architecture use a modified Harvard architecture (a variation of the Harvard computer architecture that allows the contents of the instruction memory to be accessed as if it were data. The original Harvard architecture computer, the employed entirely separate memory systems to store instructions and data. The CPU fetched the next instruction and loaded or stored data simultaneously and independently. This is in contrast to a Von Neumann architecture computer, in which both instructions and data are stored in the same memory system and (without the complexity of a CPU cache) must be accessed in turn. The physical separation of instruction and data memory is sometimes held to be the distinguishing feature of modern Harvard architecture computers. With microcontrollers (entire computer systems integrated onto single chips), the use of different memory technologies for instructions (e.g. flash memory) and data (typically read/write memory) in von Neumann machines is becoming popular. The true distinction of a Harvard machine is that instruction and data memory occupy different address spaces. A memory address does not uniquely identify a storage location as it does in a Von Neumann machine. It is required to know the memory space (instruction or data) to which the address belongs) which not only physically separates storage and signal pathways for instructions and data, but also separates the read-only and read/write part of data. Since SSS is not multiplicatively homomorphic, degree reduction is needed after several multiplications. This special structure allows implementing READ and WRITE operations in relatively efficient manner. In particular, the degree of the polynomials used for the read-only part (possibly big-data corpus) is unchanged throughout the execution(s).

The parameters of the proposed architecture are presented in Table 1.

TABLE 1

The parameters of a program

| Parameter | Description |
|---|---|
| m | The number of instructions of the user program |
| n | The number of data items that can be accessed for read and write |
| k | The number of data items that can be accessed for read only |
| t | The bit length of the data stored in the memory |

Here, it is assumed that the client program reads a large number of data items compared with the data items the program writes to, thus k>>n.

The following description shows how to simulate the four basic operations using the Accumulating Automata technique.

Operation Details

The implementation of a function called: compare(U; V; r) will be described first, where U and V are secret shares of the unary address consisting of r elements. For example, $U=u_1, u_2, \ldots, u_r$ and $V=v_1, v_2, \ldots, v_r$ denote the secret shares of two such parameters. The following computation is performed:

$$\text{compare}(U, V, r) = \sum_{i=1}^{r}(u_i \times v_i)$$

Analogous to Equation (1), the above expression testifies whether U, V are identical or not. Based on Lemma 1 above, it is clear that the result of compare (U, V, r) is a secret share of 1 if U=V, and is 0 if U≠V.

Procedure LOAD(H)

1: for i = 1 to m do
2:   $\text{Num}_i \leftarrow \text{compare}(H, \eta_i, m)$
3:   $S_1 \leftarrow S_1 + \text{Num}_i \times A_i$
4:   $S_2 \leftarrow S_2 + \text{Num}_i \times B_i$
5:   $S_3 \leftarrow S_3 + \text{Num}_i \times C_i$
6:   $S_4 \leftarrow S_4 + \text{Num}_i \times (PC_i + 1)$
7: end for
8: return $S_1 \| S_2 \| S_3 \| S_4$ Procedure JUMP(C)

1: PC ← C
2: LOAD(PC)

Procedure READ(X)

1: for i = 1 to n + k do
2:   $\text{Num}_i \leftarrow \text{compare}(X, \in_i, n + k)$ Procedure READ(X)

3:   $S \leftarrow S + \text{Num}_i \times \theta_i$
4: end for
5: return S

Procedure WRITE(X, Y)

1: for i = 1 to n do
2:   $\text{Num}_i \leftarrow \text{compare}(X, \in_i, n + k)$
3:   $\theta_i \leftarrow \theta_i + \text{Num}_i \times (Y - \theta_i)$
4: end for Description of LOAD:

The initial values of Si are set to 0, and the symbol k means concatenation of all values from S1 to S4. H represents the secret shares of the instruction address which we want to load and i represents secret shares of the i-th instruction address. Based on Lemma 1, it is possible to check that only when the two addresses are identical, the result of function compare is 1, otherwise the result is 0. Thus, the value returned is the right instruction to be loaded.

Description of JUMP:

The operation JUMP is nearly the same as the operation LOAD. If the program needs to execute the C-th instruction in the program table, it just assigns the last part of current instruction to the PC. Then the program will "jump" to the destination.

Description of READ:

According to FIG. 2, the format of the memory table consists of two parts: the address number $\in_i$ and data $\theta_i$. Analogous to the corresponding analysis for the LOAD operation, it is possible to check that S is the data whose index number is equal to X.

Description of WRITE:

The operation implements writing the data Y in the address X using secret shares. Only when $\in_i$ equals X, the $\text{Num}_i$ is the secret shares of 1, and then the data Y can substitute the former data item, otherwise the data will not be changed.

Implementation of SSS-Subleq

The subtraction of operands when they are represented by secret shares will be described below. According to Subleq definition, the result of subtraction should be compared with zero for conditional branch. However, it is difficult to compare two numbers directly, since all the numbers are secret shared and the clouds never know the secrets. Here, Two's complement representation is used to represent the operands and using the sign bit to simulate the comparison. In two's complement representation, the sign bit of positive integer is 0 and negative integer is 1. Therefore, when implementing SUBLEQ (A,B,C), we can use the sign bit of Mem[B]−Mem[A] to (blindly) decide whether to branch or not. The only problem is that the integer 0, for which the sign bit in its representation is also 0, while it should imply branching. This problem can be fixed by a slight modification:

The sign bit of Mem[B]-Mem[A]-1 is used instead of sign bit of Mem[B]-Mem[A].

The new sign bit is 0 if Mem[B]>Mem[A], and 1 if Mem[B]≤Mem[A] which satisfies the branch condition of Subleq. Moreover, this sign bit can be obtained during the computation of Mem[B]-Mem[A], as will be described below.

Two's Complement Subtraction

The advantage of using Two's complement is the elimination of examining the signs of the operands to determine if addition or subtraction is needed. Therefore, to compute subtraction $\beta-\alpha$, it only needs to perform following steps:

Convert $\alpha$: Invert every bit of $\alpha$ and add one, denoted by $\overline{\alpha}+1$.

Addition: Perform binary addition and discard any overflowing bit, denoted by $\beta+\overline{\alpha}+1$.

The sign bit of $\beta-\alpha-1$ is required, as well. As described above, using Two's complement representation, the subtraction $\beta-\alpha$ is converted to $$\beta+\overline{\alpha}+1$$

Similarly, the subtraction $\beta-\alpha-1$ is implemented as $$\beta-\alpha-1=\beta+\overline{\alpha}+1-1=\beta+\overline{\alpha}$$

The similarity allows us to implement these two subtractions together.

The algorithm for Two's complement subtraction using SSS is given in Algorithm 2 below.

---

Algorithm 2: The two's complement substraction using Shamir secret sharing

1: Procedure SSS-SUB (A, B)
2:   Input: A = $[a_{t-1}a_{t-2}...a_1a_0]$, B = $[b_{t-1}b_{t-2}...b_1b_0]$ where $a_i,b_i$ are secret shares of bits of two's complement represented number.
3:   Output: R = $[r_{t-1}r_{t-2}...r_1r_0]$ where R = B − A, and the sign bit of B − A − 1
4:   $a_0 = 1 - a_0$                    ◇ Invert of the least significant bit
5:   carry[0] = $a_0 \cdot b_0$
6:   $r_0 = a_0 + b_0 - 2 \cdot$ carry[0]    ◇ Addition of the least significant bit
7:   for i = 1 to t − 1 do
8:     $a_i = 1 - a_i$                   ◇ invert each bit A ← $\overline{A}$
9:     $r_i = a_i + b_i - 2a_ib_i$
10:    carry[i] = $a_ib_i$ + carry[i − 1] · $r_i$    ◇ The carry bit
11:    $r_i = r_i$ + carry[i − 1] − 2 · carry[i − 1] · $r_i$    ◇ The result bit
12:   end for
13:   sign = $r_{t-1}$                  ◇ The sign bit of B − A − 1, used for branch
14:   carry[0] = $r_0$                  ◇ Add 1 to the result obtain B − A
15:   $r_0 = 1 - r_0$
16:   i = 1 to t − 1
17:   carry[i] = $r_i$ · carry[i − 1]
18:   $r_i = r_i$ + carry[i − 1] − 2 · carry[i]
19:   end for
20:   return (R ∥ sign)
21: end procedure

---

According to the proof of Lemma 1, the multiplications and additions/subtractions of the shares corresponding to those of the secrets are known. Thus, one can easily check that Algorithm 2 implements the two's complement subtraction.

Subleq can be implemented with secret shares using by Algorithm 3.

---

Algorithm 3: The Shamir secret sharing based Subleq

1: Procedure SSS-Subleq (A, B, C)
2:   $R_1$ ← Read(A)
3:   $R_1$ ← Read(B)
4:   (R ∥ Num) = SSS-SUB ($R_1$, $R_2$)
5:   Write(B, R)
6:   Jump (Num · C + (1 − Num) · (PC + 1))
7: end procedure

---

In step 6 of Algorithm 3, it is possible to check that if the value represented by R2 is less than R1, then Num=1, PC=C, else Num=0, PC=PC+1.

Therefore, the expression of Step 6 implements the conditional branch of Subleq.

Degree Reduction

The main bottleneck the proposed scheme is the multiplication with shares used in the basic operations, as the SSS is additional homomophic but not multiplicatively homomorphic. Multiplying two polynomials gives a polynomial with a degree that is equal to the sum of the degrees of the source polynomials. This implies that the client has to use more shares to reconstruct the secret after multiplication.

---

Algorithm 4: Polynomial degree reduction for secret shares

1: Procedure $D_{ECREASE}$ ( P(x),d,d* )
2:   Let $u_1, ..., u_E$ be E participants, D be the randomizer and R be the reducer.
3:   Let P(x) ∈ $F_P$[x] of degree d is the polynomial for secret s.
4:   D randomly selects polynomial f(x) of degree d and g(x) of degree d*, where f(x) and g(x) have the same constant term.
5:   for i = 1 to E do
6:     D sends ( f($u_i$),g($u_i$)) to $u_i$.
7:     $u_i$ computes P($u_i$) + f($u_i$) and sends it to R.
8:   end for

---

-continued

Algorithm 4: Polynomial degree reduction for secret shares

9:   R interpolates and computes a polynomial Q(x) = P(x) + f(x).
10:  for i = 1 to E do
11:    R sends to $u_i$ the coefficients $q_j$ of Q(x) with degree more than d*.
12:    $u_i$ computes S = P($u_i$) + f($u_i$) − $\Sigma_{j=d^*+1}^{d} q_j u^j$ − g($u_i$).
13:    return S .
14:  end for
15: end procedure

---

The READ, JUMP and LOAD increase the polynomial degrees related to each secret shared bit stored in the registers and the subtraction and WRITE increase the degrees related to the data items stored in the memory. Therefore, a degree reduction process for these data items should be carried out at a certain time. Standard techniques for reducing the degree using communication can be used here. One possible procedure for degree reduction is by using the article "Swarming Secrets" (Dolev et al., 47th Annual Allerton Conference, 1438-1445, 2009) proposes a method for reducing the polynomial degree without revealing the original secret. The model proposed by the present invention defines a reducer that is in charge of reducing the polynomial degrees and a randomizer in charge of generating random polynomials for all the participants. The codes of the reducer and the randomizer should be executed independently, in order to protect the secrets, but either of them can be executed by the dealer machine. The polynomial degree reduction algorithm appears in Algorithm 4 (The original algorithm is designed for bivariate polynomial, so it has been modified accordingly).

Different from the "Swarming Secrets" algorithm, the random polynomials f(x) of degree d instead of d* is used. It is clear that adding f(x) to P(x) can hide all the coefficients of P(x) which prevent the reducer from obtaining any information about the secret s.

In addition, another random polynomial g(x) of degree of d* is used is used, where the constant term of f(x) and g(x) are identical. In the end of Algorithm 4, each cloud subtracts g($u_i$) from the result which will keep the secret s unchanged (the change in the values of other coefficients of the polynomial does not influence the secret value). To protect the secrets, for every degree reduction, the random polynomial f(x), g(x) should be updated. In practical implementation, the dealer (with no randomizer) can secret share these polynomials to the clouds in advance or let clouds interact with the randomizer, thereby supplying on-line these f(x) and g(x) pairs upon request and the degree reduction process is performed with no involvement of the dealer during the execution.

---

Algorithm 5: The SSS-Subleq plus degree reduction

1: Procedure SSS-$S_{UBLEQ}$-DR ( A, B, C )
2:     Decrease( A ∥ B ∥ C ∥ PC + 1,3l,l)
3:     $R_1$ ← Read(A)
4:     $R_2$ ← Read(B)
5:     R ∥ Num = SSS − SUB($R_1$, $R_2$)
6:     Decrease(R ∥ Num,*,l)
7:     $W_{RITE}$(B, R)
8:     Jump(Num· C + (1 − Num) · (PC + 1))
9: end procedure

---

In the architecture proposed by the present invention, the read/write memory is separated from the read-only memory. This design is more convenient for degree reduction, compared to conventional architecture. The reduction step is performed before the WRITE and JUMP operations. Compared with the whole memory space, the number of read/write registers is very small, thus, the number of items for which we need to reduce the degree is relatively small. Assuming that both the addresses and data items are secret shared using the polynomials of the same degree λ, plus degree reduction step, the Subleq can be implemented as in Algorithm 5. In step 6 of Algorithm 5, * is used instead of the exact degree parameter, as each secret shared bit of R has different polynomial degree.

Applications

In the proposed model, it is assumed that a client wishes to outsource the execution of a program among E clouds and the program is compiled into a SUBLEQ-based program. The address is encoded using unary representation and the data item is encoded using Two's complement representation. The dealer picks random polynomials of degree λ to share every bit of the address and data. Then the dealer sends the secret shared program to E clouds. The integer E should be greater than the highest polynomial degree generated during Algorithm 5.

The participating clouds do not communicate with each other and are possibly not aware concerning the number and identity of the other participants.

Initial Stage

The PC of each cloud is initially set by the dealer. The values of the PC are the secret shares of the first address of the client's program. In case when there is no randomizer in the system, the dealer can guarantee that each cloud has enough pre-computed values of polynomials to be used for degree reductions during the execution.

Execution Stage

In this stage, the clouds have to perform the following tasks:

Program Execution: Each cloud executes the secret shared program independently and does not communicate with other clouds.

Degree Reduction: Each cloud performs Algorithm 4 to reduce the polynomial degree of the shares which increased during the Subleq procedure. Furthermore, every cloud may record the communication with the randomizer and reducer for audit, revealing possible malicious reducers. A possible strategy is to use several reducers simultaneously. After each cloud received the answers from the reducers, the could compares these results and notifies the client/dealer whether the reducers were malicious or not. Similarly the actions of the randomizer can be monitored, for example, by forwarding the values sent by the randomizer to the reducer, while requesting the reducers to reveal all coefficients and not use these values, and requesting new values from the randomizer.

Memory refresh: Although the polynomial degree of the shared secret has been decreased before WRITE operation, the WRITE operation does increase the polynomial degree by λ each time. Thus, the read/write part of memory needs to be refreshed at intervals (e.g., every ten WRITE operations). This part of the memory can be relatively small compared to the entire memory, so it will not lead to too much bandwidth usage.

Figure 3:
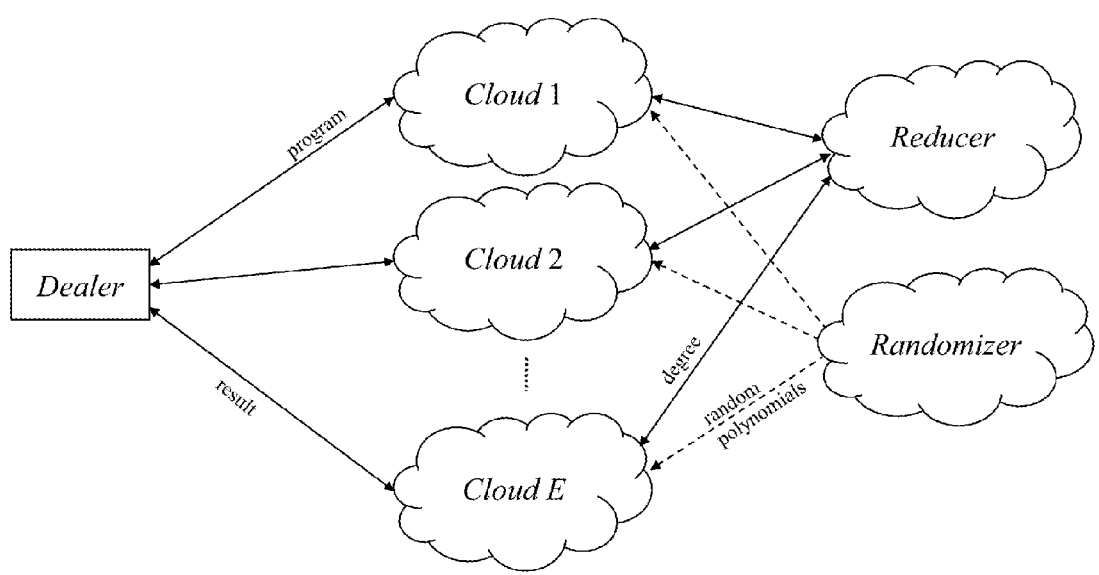
FIG. 3 illustrates the outline of the proposed RAM model and its use for the program execution.

FIG. 3 illustrates the outline of the proposed RAM model and its use for the program execution. The communication between the clouds and the dealer and the communication between the clouds and the reducer(s) are all bidirectional. The dealer sends the secret shares of the client program and receives and reconstructs the program results executed by the various clouds. It is possible to use more than one reducer in order to check the integrity of the results and identify which reducer is malicious. The dealer (and reducer(s)) may share common roots of all polynomials, unknown to the participating clouds, where addition and multiplications keep the roots unchanged. These unknown roots can serve as additional keys, since the number of possible roots grows exponentially with the degree of the polynomials.

Storage and Bandwidth

The storage of each cloud consists of the secret shares of the program instructions and the data. Secret share of one bit needs one or multi-word size storage which is denoted by ω(1).

Data Table

Each row of the data table consists of the index and data item, it totally requires (n+k)(n+k+t)ω(1) words storage. As previously assumed, the size of read-only table is much bigger than that of the read/write table, i.e., k>>n, the storage requires roughly O($k^2$)ω(1) words.

Instruction Table

The cloud stores an instruction table of size m, and each instruction consists of five parts. This requires O(m) blocks of storage, while each block requires O(3m+2 n+2 k)ω(1) words.

Degree Reduction Table

According to the corresponding description of Algorithm 4, if a randomizer (or several randomizers) are used to produce secret shares of random polynomials on-line, no tables are needed. Otherwise, every cloud needs to store a certain amount of shares which are pre-computed and dispatched by the dealer. These values could be generated and managed by a special database. The size of this database depends of the execution length of the program.

Bandwidth

For each Subleq, the clouds need to reduce the polynomial degrees of their data twice via communication with the reducer (and the randomizer). For each degree reduction from d to d*, every cloud first obtains two shared evaluations from the randomizer, and then sends to the reducer one word and receive d−d* coefficients from it, resulting in a total of approximately $O(k+m+t)\omega(1)$ words bandwidth used per cloud for one Subleq. In addition, the read/write memory needs to be refreshed at interval, it will result in $O(kt)\omega(1)$ words bandwidth usage. Therefore, in the worst case, the bandwidth of each cloud is $O(kt)\omega(1)$.

According to another embodiment, a program to be executed by untrusted participants may remain unrevealed by using a fixed set of commands that appear in a fixed order, rather than using only the SUBLEQ command. According to this embodiment, other OISC, RISC, Ultra-Reduced Instruction Set Co-Processor (URISC), or even other type of commands may be added.

For instance, a compiler from high language such as a C compiler will produce programs only in the style of, where addresses are secret shared (as illustrated above):

Address=100: Opcode1, address, address, address, Opcode2, address, address, address . . . .

Opcodek, address, address, address

Address=101: Opcode1, address, address, address, Opcode2, address, address, address . . . Opcodek, address, address, address Address=102: Opcode1, address, address, address As all programs consist of the same sequence of opcodes, no information will be revealed regarding the program to be protected, still the execution may blindly select the result of (the) one (desired) opcode. Therefore, the computation power is at least as good as using only Subleq, but can be dramatically better as other opcodes and operations will be implemented.

Security Analysis

During the whole procedure of the proposed model, all of the information are secret shared among E clouds and no original information will be leaked to the cloud itself.

Also, the proposed model has two characteristics:

Security against adversary eavesdropping;

For every LOAD operation, procedure compares the values stored in PC with all the indices in program table. It "touches" every position in the program table. Even through the adversary could eavesdrop on all the contents of PC, registers, etc., the adversary could not know which instruction in the table was executed. The same thing also happens in read/write operations. The characteristic is similar to the schemes that are based on fully homomorphic encryption, but is information-theoretically secure.

Security Against Malicious Clouds

A malicious server can corrupt data in storage and deviate from the prescribed protocol, particularly, not performing execution correctly. However, the program is outsourced to E clouds. Even if some of them output the wrong answers, the client can compare the results interpolated from different set of answers and obtain the correct result, or better off, use the method for error correction for algebraic block codes, described for example, in U.S. Pat. No. 4,633,470.

Unary vs. Binary

The proposed scheme uses the unary representation for the instruction and data addresses. This type of representation is inappropriate if the clients program is very large because of its redundant bits. In a secret shared form, n words must be used to represent these n bit, which will lead to many operations over Fp. As described above, binary representation can be used as a substitution. Compared with unary representation, binary representation can express exponentially more numbers with the same number of bits. However, using binary representation to perform secret string matching is more complicated and will require more degree reduction operations. In practical implementation, one can choose the representation based on the consideration of their memory and computation capacity.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method of providing a distributed scheme for executing a random access memory (RAM) program, without revealing any information regarding said program, the data and the results, comprising:
   a) simulating the sequence of instructions of said program using one instruction set computing (OISC) or subtract and branch if less than or equal to zero (SUBLEQ) instructions having predefined parameters A, B, C being memory addresses, where the contents at B are subtracted from the contents at address A, and the result is stored at address B, and then, if the result is not greater than 0, the executing jumps to the memory address C, or otherwise, said execution continues to the next instruction in the sequence;
   b) dividing the execution of said program among a plurality of participating computational resources or clouds which do not communicate with each other;
   c) hiding the nature of operation and the sequence of operations of all the program's OISC or SUBLEQ instructions by secret sharing said parameters;
   d) secretly performing private string matching by comparing strings represented in secret shares, for ensuring the execution of the right instruction sequence by:
      d.1) comparing strings of secret shares of characters to be matched;
      d.2) multiplying secret shares of corresponding bits of each string to be matched by the data said string should be matched with, one bit with another;
      d.3) performing summation that result in secret shared="1" if there is a match and in secret shared="0" otherwise;
      d.4) repeating steps d.1) and d.2) for every character in said strings, while performing multiplication among summation results;
   e) performing arithmetic operations over secret shared bits by manipulating the secrets directly, while hiding said program and data during the entire execution time;
   f) performing branch operations according to the secret shared sign bit of the result.

2. A method according to claim 1, wherein secret sharing is performed according to Shamir's secret sharing, using random polynomials by allowing a dealer to:

a) select additional points, x, such that, P(x)=0 when choosing the random polynomials P(x);

b) distribute n points having x values which are different from the x values of these additional points in P(x)=0, while storing said additional points to itself as an additional secret for revealing the polynomials value.

3. A method according to claim 2, wherein whenever performing multiplication operation is required, performing degree reduction of the polynomial used for secret sharing.

4. A method according to claim 2, wherein the dealer reconstruct the polynomial and the secret, using the n points of said polynomial that are maintained by the participating clouds with the additional points that are maintained by said dealer.

5. A method according to claim 2, wherein the keys are restricted to be points in which the polynomial is zero for every value, thereby allowing additions and multiplications while preserving the secret key unchanged.

6. A method according to claim 1, wherein string matching of secret shares is performed according to the scheme of Accumulating Automata and Cascaded Equations Automata using unary, binary or other representations, and secret shares of the searched pattern.

7. A method according to claim 1, wherein secret shared Subleq is created using a unary representation to represent the addresses including memory addresses and instruction indices, where each bit of the unary representation is encoded as a secret shared value, where the first block stores the instruction index number, being equivalent to the instruction address, the second and the third blocks store the operand addresses and the fourth to fifth blocks store the branch index and the index of next instruction, respectively.

8. A method according to claim 1, wherein subtraction is performed by representing every operand as a signed number using a Two's complement representation and transforming subtraction into addition, such that the most significant bit is the sign bit.

9. A method according to claim 2, wherein the dealer divides the execution among participating clouds by:
a) encoding the address using unary representation;
b) encoding the data item using Two's complement representation;
c) allowing said dealer to pick random polynomials of degree to share every bit of the address and data; and
d) allowing said dealer to send the secret shared program to E participating clouds, such that the integer E is greater than the highest polynomial degree generated.

10. A method according to claim 1, wherein all programs consist of the same sequence of opcodes, where the execution may execute all opcodes and select only the one intended.

11. A method according to claim 1, wherein instead of using only a SUBLEQ command, a program to be executed by untrusted participating clouds may remain unrevealed using a fixed set of commands that appear in a fixed order.

12. A method according to claim 1, wherein the RAM program uses a modified Harvard architecture which physically separates storage and signal pathways for instructions and data.

13. A method according to claim 1, wherein the RAM program separates the read-only and read/write part of data.

14. A method according to claim 3, further comprising reducing the degree of the polynomials after a predetermined number of multiplications.

15. A method according to claim 3, wherein the degree of the polynomials used for the read-only part is unchanged throughout the execution(s).

16. A method according to claim 1, wherein the read/write part of the memory is refreshed at intervals of several WRITE operations.

17. A method according to claim 10, wherein the execution is performed blindly, and is defined by the operands addresses, some of which are designed to have no effect.

18. A method according to claim 1, wherein the computational resource(s) consists of one or more clouds.

19. A method according to claim 1, wherein the program is run over one or more computational resources, such that possible leakage may reach the same vendor or country or entity.

20. A method according to claim 1, wherein the program is run over one or more computational resources, such that possible leakage may reach competing, non-collaborating, vendors or countries or entities.

21. A method according to claim 1, wherein the OISC instruction is SBNZ, SUBLEQ, or ADDLEQ instruction.

22. A system of providing a distributed scheme for executing a random access memory (RAM) program, without revealing any information regarding said program, the data and the results, comprising:
a) a compiler for simulating the sequence of instructions of said program using one instruction set computing (OISC) or subtract and branch if less than or equal to zero (SUBLEQ) instructions having predefined parameters A, B, C being memory addresses, where the contents at B are subtracted from the contents at address A, and the result is stored at address B, and then, if the result is not greater than 0, the executing jumps to the memory address C, or otherwise, said execution continues to the next instruction in the sequence;
b) a plurality of computational participating clouds, each of which is a adapted to execute a portion of said RAM program;
c) a computerized dealer, being in bidirectional communication with said clouds, for dividing the execution of said program among said clouds to program portions using secret sharing of said parameters, based on random polynomials and for and composing the result of executing said program by collecting partial results, each of which being the outcome of executing a portion of said RAM program assigned to a cloud;
d) at least one processor for secretly performing private string matching for ensuring the execution of the right instruction sequence, said at least one processor is adapted to:
d.1) compare strings of secret shares of characters to be matched;
d.2) multiply secret shares of corresponding bits of each string to be matched by the data said string should be matched with, one bit with another;
d.3) perform summation that result in secret shared="1" if there is a match and in secret shared="0" otherwise;
d.4) repeating steps d.1) and d.2) for every character in said strings, while performing multiplication among summation results;
e) at least one computerized randomizer being in bidirectional communication with said clouds, for providing said random polynomials to said clouds; and
f) at least one computerized reducer being in bidirectional communication with said clouds, for reducing the degree of polynomials in response to the execution of multiplication instructions, without revealing the secret.

23. A system according to claim 22, wherein several reducers are used for checking the integrity of the results and in case of non-integrity, identifying which reducer is malicious.

24. A system according to claim 22, wherein the dealer and the reducer(s) share common roots of all polynomials, unknown to the participating clouds, such that additions and multiplications keep the roots unchanged.

* * * * *